United States Patent
Seiler et al.

(10) Patent No.: US 12,182,238 B2
(45) Date of Patent: Dec. 31, 2024

(54) GESTURE BASED ACCESSES

(71) Applicant: Hewlett-Packard Development Company, L.P., Spring, TX (US)

(72) Inventors: Peter Seiler, Fort Collins, CO (US); Adolfo Adolfo Gomez, Fort Collins, CO (US); Connor Jam Watkins, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 824 days.

(21) Appl. No.: 17/045,780

(22) PCT Filed: Jun. 12, 2018

(86) PCT No.: PCT/US2018/037029
§ 371 (c)(1),
(2) Date: Oct. 7, 2020

(87) PCT Pub. No.: WO2019/240766
PCT Pub. Date: Dec. 19, 2019

(65) Prior Publication Data
US 2021/0089638 A1  Mar. 25, 2021

(51) Int. Cl.
*G06F 21/32* (2013.01)
*G06F 21/45* (2013.01)
*G06V 40/20* (2022.01)

(52) U.S. Cl.
CPC ............ *G06F 21/32* (2013.01); *G06F 21/45* (2013.01); *G06V 40/20* (2022.01)

(58) Field of Classification Search
CPC .......... G06F 21/32; G06F 21/45; G06V 40/20
See application file for complete search history.

(56) References Cited

U.S. PATENT DOCUMENTS

| | | | |
|---|---|---|---|
| 6,421,453 B1 * | 7/2002 | Kanevsky | G06F 21/316 340/5.2 |
| 7,971,156 B2 | 6/2011 | Albertson et al. | |
| 9,195,813 B2 * | 11/2015 | Hrybyk | G06F 21/31 |
| 9,355,236 B1 | 5/2016 | Kratz et al. | |
| 9,626,498 B2 | 4/2017 | Gay et al. | |
| 9,811,650 B2 | 11/2017 | Todeschini | |
| 9,921,659 B2 | 3/2018 | Weber et al. | |
| 2008/0235772 A1 | 9/2008 | Janzen | |
| 2014/0267611 A1 * | 9/2014 | Kennett | G06V 40/23 348/46 |
| 2014/0361976 A1 * | 12/2014 | Osman | G02B 27/017 345/156 |

(Continued)

OTHER PUBLICATIONS

Roshandel Mehran, Multi-Factor Authentication based on Movement and Gesture, Jun. 15, 2017, Berlin University.

*Primary Examiner* — Chau Le
(74) *Attorney, Agent, or Firm* — Knobbe, Martens, Olson & Bear, LLP (57) ABSTRACT

An enhanced reality system that includes a plurality of sensors to detect relative positions of a user's body and changes in positions of the plurality of sensors over time and a controller to: receive data from the sensors and determine a gesture made by the user; and an authentication module to, when executed by the controller translate the gesture into a passcode and authorize access to digital content based on verification of the passcode.

10 Claims, 3 Drawing Sheets

(56) References Cited

U.S. PATENT DOCUMENTS

2015/0049017 A1\* 2/2015 Weber .................... G06F 21/36
                                                    345/156
2015/0177842 A1   6/2015 Rudenko
2016/0358181 A1  12/2016 Bradski
2017/0187712 A1\*  6/2017 Carrizo .................... G07C 9/35
2017/0351345 A1\* 12/2017 Nirjon .................... G06F 3/014
2018/0158060 A1\*  6/2018 Adams ................. H04W 12/06

\* cited by examiner

GESTURE BASED ACCESSES

BACKGROUND

Augmented reality, virtual reality, and mixed reality all involve users interacting with real and/or perceived aspects of an environment in order to manipulate and/or interact with that environment. Interaction by a user in the augmented reality, virtual reality, and/or mixed reality environments may be viewed by others via a display device communicatively coupled to an augmented reality, virtual reality, and/or mixed reality system.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Virtual reality (VR), augmented reality (AR), and mixed reality (MR) systems and devices are used by a user to perceive a visual representation of a VR, AR, and/or MR environments. VR systems and devices implement virtual reality (VR) headsets to generate near real-life, abstract, surreal, and/or realistic images, sounds, and other human discernable sensations that simulate a user's physical presence in a virtual environment presented at the headset. In some examples, the VR system and/or device includes physical spaces and/or multi-projected environments. AR systems and devices may include those systems and devices that implement live direct and/or indirect view of a physical, real-world environment whose elements are augmented by computer-generated sensory input such as sound, video, graphics and/or GPS data. MR systems and devices include the merging of real and virtual worlds to produce new environments and visualizations where physical and digital objects co-exist and interact in real time. For simplicity in description, a virtual reality (VR), augmented reality (AR), and mixed reality (MR) systems and devices are referred to herein as enhanced reality (ER) systems and/or devices.

During use of these ER system and/or devices, users may not be able to readily interface with other human interface devices or input devices such as keyboards, mice, or display devices exterior to these systems. Indeed, in connection with a virtual reality system, a user who is implementing a virtual reality headset may not be able to discern the placement of these other input devices unless the user removes the virtual reality headset. Virtual input devices may be presented in the enhanced reality experience, but the inclusion of these virtual devices may implement additional processing power, implement additional computer readable program code and may not be as user friendly in the virtual environment relative to a real-life environment. In the case of other enhanced reality systems, a user may be preoccupied with handling other input devices that allow the enhanced reality environment to be presented to the user such as controllers and other visual aids.

The present specification describes an enhanced reality system and devices associated with that system that translates passcodes into a series of user-authenticated gesture data that may be used by the user via the enhanced reality system to provide access to password protected operating systems, applications, data, web browsers, and digital content, among other types of secured data and digital content. In the present specification and in the appended claims, the term "user-authenticated gesture data" may be any data derived from any number of sensors used to capture a user's body movements. In an example, the user's body movements may be specific to the individual user and may, thereby, be used for authentication of a user in gaining access to digital content. In an example, the data may not be translated into a password, passcode, or hash, but rather used as authentication information on its own without translation. In this example, a 3D representation of the user-authenticated gesture data may be stored as well in the form of a CAD model. In any example presented herein, the term "passcode" may be interpreted to include the "user-authenticated gesture data" as defined herein.

The present specification describes an enhanced reality system that includes a plurality of sensors to detect relative positions of a user's body and changes in positions of the plurality of sensors over time and a controller to: receive data from the sensors and determine a gesture made by the user; and an authentication module to, when executed by the controller translate the gesture into a passcode and authorize access to digital content based on verification of the passcode.

The present specification further describes a gesture-based authentication system that includes a controller to: receive data, from a plurality of biometric sensors, describing relative positions of a user's body; create a verification file based on the data describing relative positions of a user's body; and authorize access to digital content to the user based on validation against the verification file. In an example, the gesture-based authentication system may create a verification file, such as a hash file, based on the data describing absolute positions of a user's body.

The present specification further describes a method of providing authentication to digital content that includes receiving data from a plurality of sensors defining relative positions of a user's body and changes in positions of the plurality of sensors over time; determining a gesture made by the user, translating the gesture into a passcode wherein the passcode is used to authenticate the user; and authenticating, by execution of an authentication module by a controller, a user to access the digital content.

As used in the present specification and in the appended claims, the term "enhanced reality (ER)" is meant to be understood as a reality that has been enhanced and presented to a user's senses via, for example, a user interface, a virtual reality system or device, an augmented reality system or device, and/or a mixed reality system or device.

Figure 1:
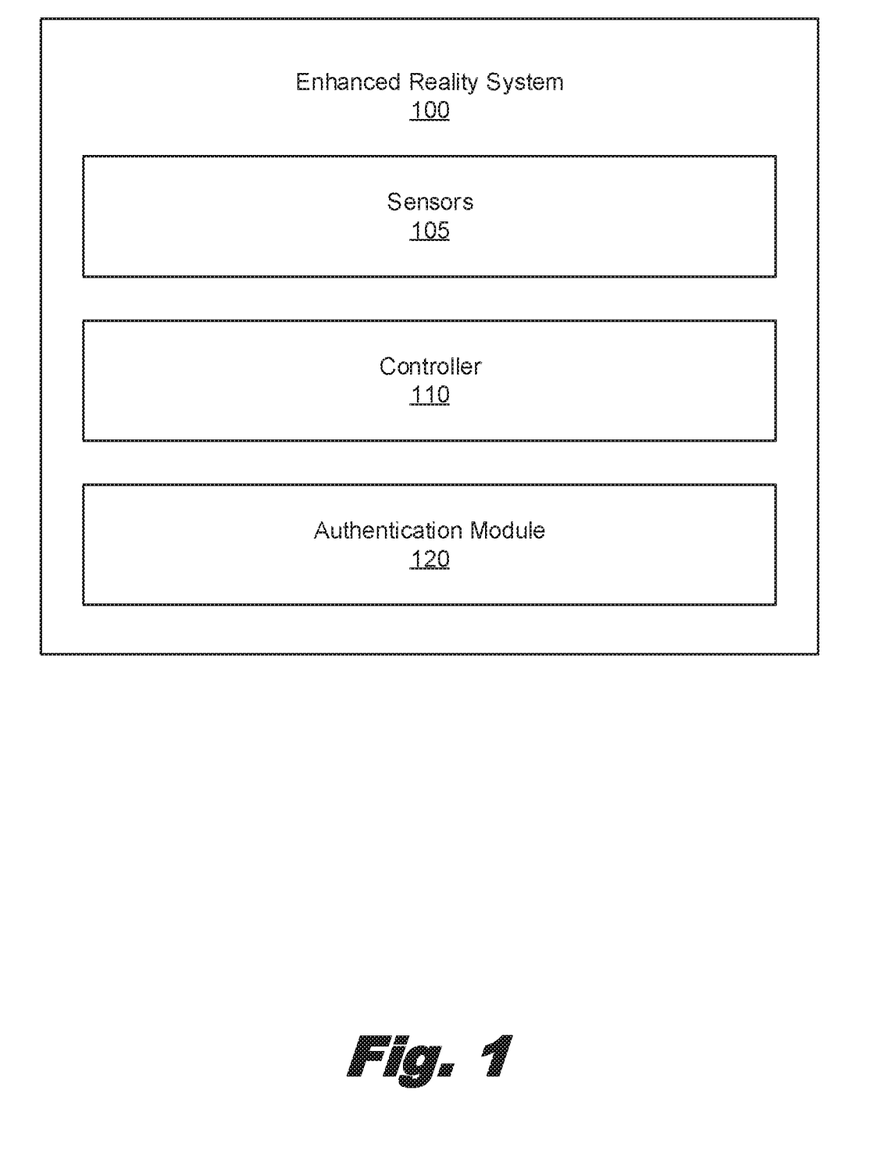
FIG. 1 is a block diagram of an enhanced reality system according to an example of the principles described herein.

Turning now to the figures, FIG. 1 is a block diagram of an enhanced reality system (100) according to an example of the principles described herein. The enhanced reality system (100) may include any device used to alter a user's perception of the real world. In some examples, these include handheld computing devices, a video output device such as a headset, input devices such as body-worn controllers, imaging devices such as cameras, among other devices to immerse a user in a partial or total virtual experience.

In the examples of the present application, the enhanced reality system (100) may include a plurality of sensors (105). The plurality of sensors (105) may be used to detect relative and/or absolute positions of a user's body and changes in positions of the plurality of sensors over time. Example sensors (105) may include either outside-in sensors or inside-out sensors. An outside-in sensor may be any sensor that, from a perspective directed towards a user, detects the position of a user's body. An inside-out sensor may be any sensor that, through the use of sensors placed on the user, detects the position of a user's body. In either example, the positions of the body parts of a user's body may be detected, in real time, over time. Tracking the position of a user's body allows a user to perform a certain number of gestures in order to be authorized access to digital content as described herein.

In any example presented herein, the sensors (105) may include a camera that, through the use of a depth sensor such as an infrared light, detects the position of a user's body at any given time. Any changes to the position of the user's body may also be detected and this data may be provided to a controller (110) associated with the enhanced reality system (100).

In any example presented herein, the sensors (105) may include a number of wearable and/or graspable devices. Examples of wearable and/or graspable devices may include body-worn controllers, headsets, elbow pads, knee pads, and chest plates, among others. In an example, the wearable and/or graspable devices may include accelerometers, optical sensors, or any other sensors that may provide data describing the positions of each of the wearable and/or graspable devices and/or the relative positions of the wearable and/or graspable devices to each other.

By way of example, a VR system may include a headset and a single or plurality of body-worn controllers. These wearable and/or graspable devices may each include, among others, motion sensors, accelerometers, and wired and/or wireless communication devices that send the information as to their position in a three-dimensional space and/or positional data relative to each other. In operation, a body-worn controller may reference a three-dimensional reference to the headset worn by the user.

Data defining the relative position of the body-worn controller with reference to the headset may be provided to the controller (110) of the enhanced reality system (100). Furthermore, as the body-worn controller is moved by the user, the relative and/or absolute position of the body-worn controller to the headset may be monitored. Certain geometries of the user's body may be extrapolated, as well, based on the positional data of the body-worn controllers relative to the headset. Still further, in an example, the information regarding the relative and/or absolute positions of the sensors may include data describing a time dimension, such as, the travel time within a 3D space of any given sensor, the time taken to complete a gesture, and acceleration of any of the given sensors, among other time-based data.

This data obtained by the sensors (105) may be compared to biometric data maintained in a look-up table associated with the enhanced reality system (100) in order to determine who, the user is, based on the geometric data obtained. Consequently, the enhanced reality system (100), through use of the sensors (105), may detect both a gesture made by a user as well as the identity of the user who made the gesture. The present specification contemplates the use of any number of body-worn controllers placed on the user's body or held by the user. As the number of body-worn controllers increases, the ability of the enhanced reality system (100) to detect more accurately an increasing number of gestures may also be increased.

In any example presented herein the sensors (105) used may implement any type of wired and/or wireless communication in order to provide data to each other and/or the enhanced reality system (100). Examples of wireless communication devices and protocols may include near field communication devices, Bluetooth communication devices implementing a time-of-flight analysis, and ultrasonic communications and devices, among other types of wireless communication devices and protocols.

In any of the examples presented herein, the enhanced reality system (100) may include a controller (110). The controller (110) may be any type of processing device that receives data and executes computer usable instructions. In an example, the controller (110) may be communicatively coupled to a data storage device. As described above, the data storage device may store data related to the look-up table that defines biometric data describing a number of user's bodies as well as access passcodes used by those users to access digital content within the enhanced reality system (100). The data storage device may, therefore, store data such as executable program code that is executed by the controller (110) or other processing device. The data storage device may specifically store computer usable instructions representing a number of applications that the controller (110) executes to implement the functionality of the enhanced reality system (100) described herein.

The data storage device may include various types of memory modules, including volatile and nonvolatile memory. For example, the data storage device of the present example may include Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage purposes. In certain examples the controller (110) may boot from Read Only Memory (ROM), maintain nonvolatile storage in the Hard Disk Drive (HDD) memory, and execute program code stored in Random Access Memory (RAM). The data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

In any example presented herein, the controller (110) may execute computer usable instructions to receive data from the sensors (105) and determine a gesture made by the user of the enhanced reality system (100). As described above the sensors (105) may provide data to the controller (110) describing their individual position with a 3D space and/or data describing their relative position to each other. With this data the controller (110) may extrapolate this data and determine what gesture was made. In any example presented herein, the controller (110) may also determine which user has made the gesture. As described, the relative position of the sensors (105) worn and/or held by the user may define the biometrics or body measurements of the user implementing the enhanced reality system (100). This data may be compared with data maintained in the look-up table in order to determine, within any standard deviation, who the person is. With subsequent iterations of recording gestures and comparing captured biometrics to data maintained in the look-up table, the certainty that a specific user is performing the gestures can be maintained. The data maintained in the look-up table may be created during a user's initial interaction with the enhanced reality system (100). In this example, the initial interaction with the enhanced reality system (100) by a new user may include sensing, via the sensors (105), the biometric data of the user so that the biometric data may be stored in the look-up table for future reference by the controller (110). As a user ages or undergoes other physical changes (e.g. physical injury or augmentation), the look-up table data may be updated in accordance with tracked changes in a user's skeletal structure. In an example, the biometric sensing information may be sufficiently robust so that a passcode would not need to be generated. Instead, the biometric sensing capability of the system may constantly monitor positions of a user's body and compare it against historical data to identify and authenticate the user concurrently and continuously during use of the system.

The look-up table may also include gesture data describing a gesture and/or a gesture made by a specific user. In an example, the controller (110) may initially determine who the user is by comparing received biometric data to biometric data within the look-up table. When the controller (110) has determined who the user is, the controller may monitor for a specific gesture made by the user.

The controller (110) may then execute an authentication module (120). The authentication module (120) is executable program code that may be executed separately. In this example, the authentication module (120) may be stored as separate computer program product on the data storage device. In another example, the authentication module (120) may be combined within a number of computer program products; each computer program product comprising a number of the modules. In an example, the authentication module (120) may be an application specific integrated circuit that is communicatively coupled to the controller (110).

In any example presented herein, the authentication module (120) may translate the gesture made by the user in to a passcode and/or user-authenticated gesture data. In an example, the authentication module (120) may translate the inputs of the gestures into American Standard Code for Information Interchange (ASCII) characters, such that the inputs are received by the enhanced reality system (100) as if they were standard keyboard inputs. In an example, the gesture may be translated into any number of ASCII characters such that the string of ASCII characters used as the passcode to access digital content is statistically impossible to break via, for example, a brute force cryptographic attack from an unauthorized user of the enhanced reality system (100). In an example, the authentication module may not conduct a translation of the inputs of the gestures into a passcode but may instead compare a 3D representation a users gestures to any 3D representation of gestures maintained in a look-up table to determine 1) the gesture made, 2) who made the gesture; and/or 3) whether that gesture is authentic to any specific user.

As described above, an initial use by the user of the enhanced reality system (100) may be the point at which this passcode is first created via the methods described. The passcode may then be stored in the look-up table such that it is associated with the specific biometric data of the specific user. As a consequence, the specific biometric data of the specific user and the specific gesture engaged in by the user may be used to translate that gesture into a passcode. When a user, therefore, engages in their specific gesture, the passcode may be received by the controller (110) and the authentication module (120) may authorize access to digital content based on verification of the passcode associated with that gesture.

The gesture acted out by the user, in an example, be a standardized gesture language, such as American Sign Language (ASL). In an example, a language of martial arts moves could be standardized such that each move is translated to a phrase or word. This may be especially convenient when applied to a gaming scenario where, during game play and to unlock certain content in the game, a user is prompted to perform a series of standardized gestures. Although the present specification describes specific examples of types or categories of gestures that may be used, these examples are not meant to limit the breadth of possible gestures that may be used in connection with the described systems and methods. Indeed, the present specification contemplates the use of any gesture by the user as the or a series of gestures recognized by the system.

In an example, a user may have a number of specific gestures associated with him/herself that, according to the translation process described, provides different passcodes. In this example, the different passcodes may provide access to distinct digital content associated with the enhanced reality system (100). By way of example, the different passcodes may be automatically recognized by a banking website, a media website, a database, an audio/video presentation, a specific program executable by the enhanced reality system (100), and a specific program executable by a computing device associated with the enhanced reality system (100), among others. Consequently, a user may have a number of gestures assigned to access a single type or a plurality of different types of digital content. Because gestures are readily easier to memorize, a user may allow the enhanced reality system (100) and more specifically the authentication module (120) to create a secure passcode or passcode based on gestures made. This provides the user of the enhanced reality system (100) to both learn relatively easy gestures while still having the security of the generated passcode to access their digital content. Additionally, the user of the enhanced reality system (100) will not interact with standard input devices such as keyboards or mice in order to input a standard passcode to gain access to their digital content. Instead, the user may interact with the headset, body-worn controllers, and/or other ER devices in order to gain such access.

In a specific example, a user may use the enhanced reality system (100) in a gaming scenario. In this example, the user may have a user-protected account associated with a game to be played on the enhanced reality system (100). Instead of first logging into the user's account with a standard keyboard or mouse using a memorized ASCII passcode, the user may "gear-up" and be ready to play the game. With the gesture-based access, the user may perform the gesture in order to gain access to the gaming account and begin to engage in the gaming experience without removing the devices used to interact with the enhanced reality system (100).

In an example, the passcode may be a verification file such as a hash value derived from execution, by the controller (110), of a hash function. In this example, the data describing the biometrics of the user and the gesture made by the user may be mapped into a hash value. Similarly, the hash value may be associated with specific user and the specific user's biometrics in order to be used to provide access to the digital content as described herein.

Figure 2:
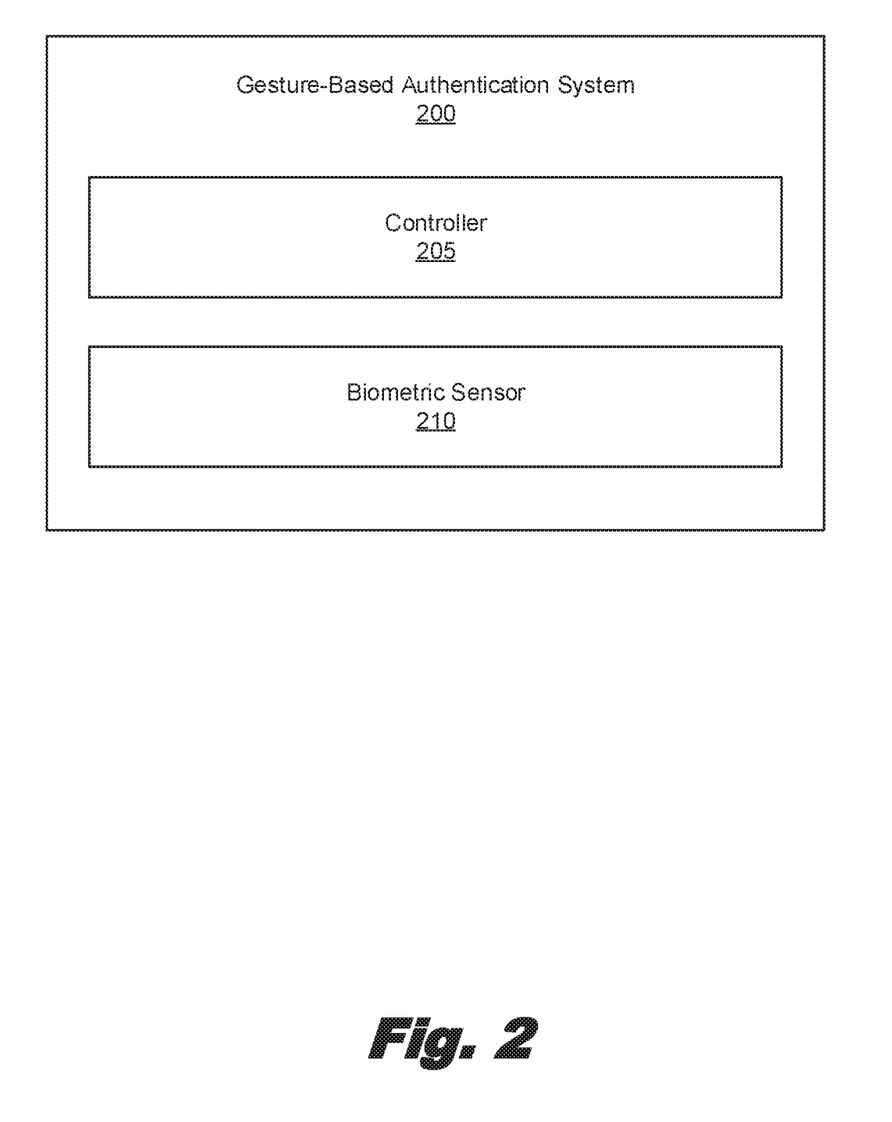
FIG. 2 is a block diagram of a gesture-based authentication system according to an example of the principles described herein.

FIG. 2 is a block diagram of a gesture-based authentication system (200) according to an example of the principles described herein. The authentication module (120) may include a controller (205). As described herein the controller (205) may receive data from a plurality of biometric sensors (210). The biometric sensors (210) may provide data to the controller (205) describing relative positions of a user's body. In an example, the relative positions of a user's body may be determined through wireless communication between the plurality of biometric sensors (210). This may allow the controller (205) to extrapolate the distances between the user's different joints, fingers, arms, legs, torso, and head. The extrapolation may be associated with a variation value such as a standard deviation so that later analysis of the biometrics of a given user may be used and deviations of certain distances may be accounted for.

In any example presented herein, the controller (205) may create a hash file based on the data describing the relative positions of the user's body. As described herein, the hash file may be associated with a specific user and a specific hash value derived from executing, with the controller (205), a hash function. The data provided to the hash function may include the gesture of the user and the biometric data obtained from the biometric sensors (210). This hash file may also be maintained in the look-up table for further use by the gesture-based authentication system (200).

In any example presented herein, the controller (205) may also, with the hash file, authorize access to digital content to a user based on verification of that hash file. In any example presented herein, the hash file may be used in any cryptographic situation in order to allow a user to access the digital content. In any example, public and/or private keys may be used in connection with the use of the hash file to allow access to the digital content either within the gesture-based authentication system (200) or over a network.

Figure 3:
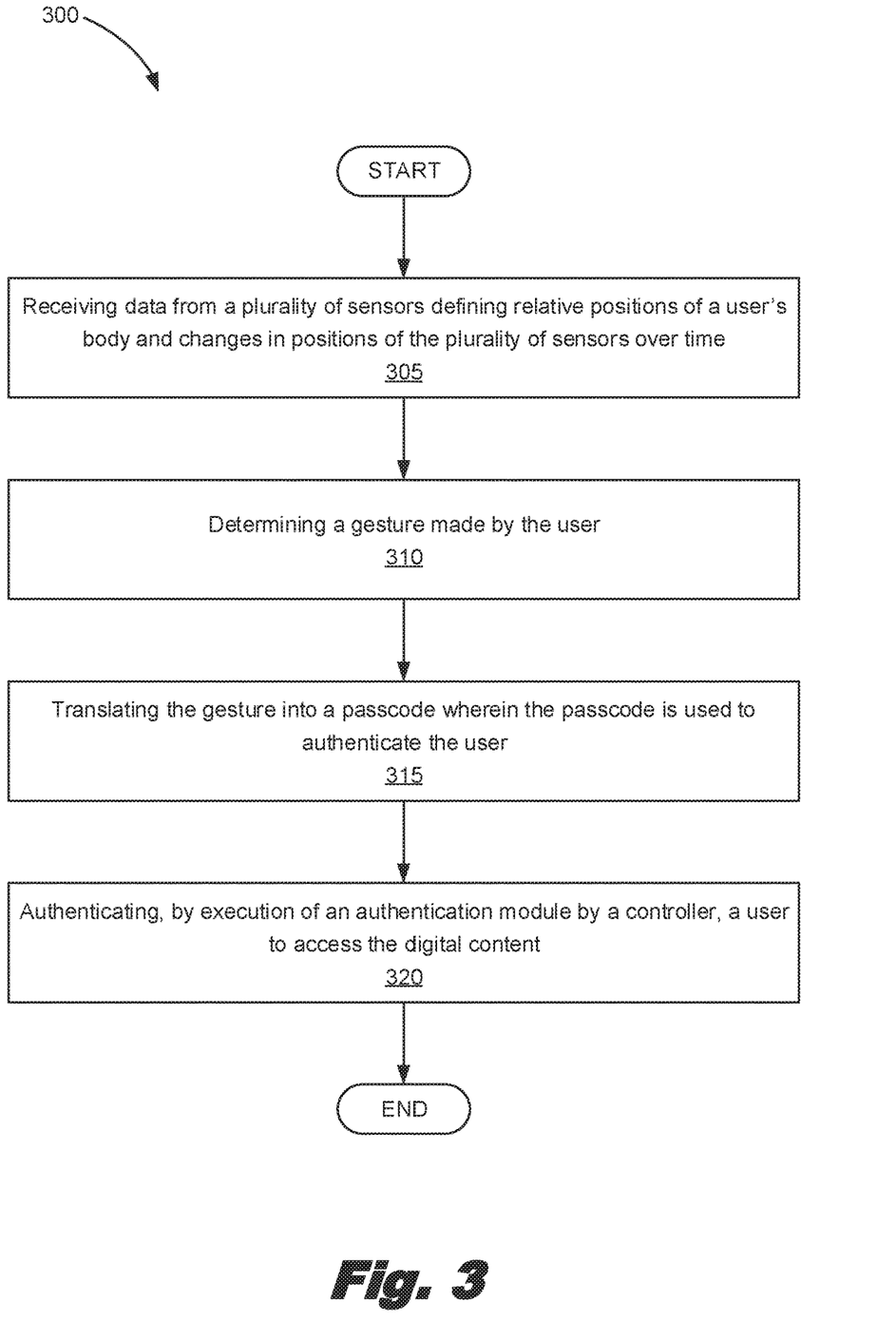
FIG. 3 is a flowchart showing a method of providing authentication to digital content according to an example presented herein.

FIG. 3 is a flowchart showing a method (300) of providing authentication to digital content according to an example presented herein. The method (300) may include receiving (305) data from a plurality of sensors (FIG. 1, 105) defining relative positions of a user's body and changes in positions of the plurality of sensors (FIG. 1, 105) over time. As described herein, the data defining the relative positions of a user's body and changes in the positions of the sensors (FIG. 1, 105) may be received by a controller (FIG. 1, 110).

The controller (FIG. 1, 110) may determine (310) a gesture made by a user. In any example presented herein, the gesture may be determined using the positions of the user's body in real-time. By sensing the user's body positions, body metrics may be determined over a given period of time. In an example, an enhanced reality system (FIG. 1, 100) may implement this method (300) and may implement the use of the sensors (FIG. 1, 105) in order to obtain biometric data that defines the relative positions of a user's body and changes in positions of the plurality of biometric sensors (FIG. 2, 210) over time.

In any example presented herein, the method (300) may continue with translating (315) the gesture into a passcode wherein the passcode is used to authenticate the user. As described herein, the translation (315) of the gesture in to a passcode may include translating (315) the gesture into passcode that includes an alphanumeric passcode. As described herein, the translation (315) of the gesture in to a passcode may include translating (315) the gesture into passcode that includes a hash file.

The method (300) may continue with authenticating (320), by execution of an authentication module (120) by a controller (FIG. 1, 110), a user to access the digital content. As described herein, the authentication (320) process may include allowing a user to any type of digital content using any number of hash files to do so. In these examples, specific types of gestures may be used to create the passcode used to access specific types of digital content.

In an example, a new user to the enhanced reality system (FIG. 1, 100) and/or gesture-based authentication system (FIG. 2, 200) described herein may be asked to produce a gesture in order to set up the passcode as described for future use of the enhanced reality system (FIG. 1, 100) and/or gesture-based authentication system (FIG. 2, 200) described herein. This sign in process may request that the user repeat the gesture a number of times so that the controller (FIG. 1, 110) may calculate a standard deviation between the plurality of gesture inputs. From the standard deviation, the enhanced reality system (FIG. 1, 100) and/or gesture-based authentication system (FIG. 2, 200) described herein may determine a tolerance for allowable deviations between the recorded gesture during the set-up process and subsequent accesses into the systems. This "gesture programming" process may be repeated any number of times to create any number of passcodes used to gain access to any number of types of digital content the user may use. In an example, a single gesture programming may be used to provide a user with access all digital content.

The enhanced reality system (FIG. 1, 100) and/or gesture-based authentication system (FIG. 2, 200) described herein may be implemented in any data processing scenario including, stand-alone hardware, mobile applications, through a computing network, or combinations thereof. Further, the enhanced reality system (FIG. 1, 100) and/or gesture-based authentication system (FIG. 2, 200) described herein may be used in a computing network, a public cloud network, a private cloud network, a hybrid cloud network, other forms of networks, or combinations thereof. In an example, the methods provided by the enhanced reality system (FIG. 1, 100) and/or gesture-based authentication system (FIG. 2, 200) described herein are provided as a service over a network by, for example, a third party. In this example, the service may comprise, for example, the following: a Software as a Service (SaaS) hosting a number of applications: a Platform as a Service (PaaS) hosting a computing platform comprising, for example, operating systems, hardware, and storage, among others; an Infrastructure as a Service (IaaS)

hosting equipment such as, for example, servers, storage components, network, and components, among others; application program interface (API) as a service (APIaaS), other forms of network services, or combinations thereof. The present systems may be implemented on a single or multiple hardware platforms, in which the modules (120) in the systems can be executed on a single or across multiple platforms. Such modules can run on various forms of cloud technologies and hybrid cloud technologies or offered as a SaaS (Software as a service) that can be implemented on or off the cloud. In another example, the methods provided by the enhanced reality system (FIG. 1, 100) and/or gesture-based authentication system (FIG. 2, 200) described herein are executed by a local administrator.

In order to allow the enhanced reality system (FIG. 1, 100) and/or gesture-based authentication system (FIG. 2, 200) described herein to communicate over a network, the enhanced reality system (FIG. 1, 100) and/or gesture-based authentication system (FIG. 2, 200) described herein or a computing device associated with the enhanced reality system (FIG. 1, 100) and/or gesture-based authentication system (FIG. 2, 200) described herein may include a network adapter. The network adapter may provide an interface to other computing devices within, for example, a network, thereby enabling the transmission of data between the enhanced reality system (FIG. 1, 100) and/or gesture-based authentication system (FIG. 2, 200) described herein and other devices located within the network.

The enhanced reality system (FIG. 1, 100) and/or gesture-based authentication system (FIG. 2, 200) described herein may also include peripheral device adapters that may provide an interface to input/output devices, such as, for example, a display device, a mouse, a keyboard the wearable and/or graspable devices, and the sensors (105), among others. The peripheral device adapters may also provide access to other external devices such as an external storage device, a number of network devices such as, for example, servers, switches, and routers, client devices, other types of computing devices, and combinations thereof.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the controller (110) of the enhanced reality system (FIG. 1, 100) and/or gesture-based authentication system (FIG. 2, 200) described herein or other programmable data processing apparatus, implement the functions or acts specified in the flowchart and/or block diagram block or blocks. In an example, the computer usable program code may be embodied within a computer readable storage medium; the computer readable storage medium being part of the computer program product. In an example, the computer readable storage medium is a non-transitory computer readable medium.

The specification and figures describe an enhanced reality system (FIG. 1, 100) and/or gesture-based authentication system (FIG. 2, 200) and a method of use. The enhanced reality system (FIG. 1, 100) and/or gesture-based authentication system (FIG. 2, 200) described herein may allow a user to gain access to digital content related to or accessible by the enhanced reality system (FIG. 1, 100) and/or gesture-based authentication system (FIG. 2, 200) by engaging in a gesture. Gestures may, via muscle memory, become easier to a user than inputting a memorized word or phrase into the systems. In such cases, a user may be less likely to forget their gesture as compared to a passcode, especially as the complexity of passcodes increases. The complexity of gestures compared to traditional passwords or passcodes is incalculable, since the number of gestures possible, the potential of high-resolution tracking of gestures, and the number of aforementioned factors related to those gestures is relatively large.

The preceding description has been presented to illustrate and describe examples of the principles described. This description is not intended to be exhaustive or to limit these principles to any precise form disclosed. Many modifications and variations are possible in light of the above teaching.

What is claimed is:

1. An enhanced reality system, comprising:
a plurality of sensors to detect relative positions of a user's body and changes in positions of the plurality of sensors over time;
a controller to:
receive data from the plurality of sensors corresponding to the relative positions of the user's body; and
determine a gesture made by the user based on a comparison of the relative positions of the user's body and a 3D representation of the gesture in a look-up table;
determine an identity of the user based on the plurality of sensors corresponding to the relative positions of the user's body; and
an authentication module to, when executed by the controller:
translate the gesture into a passcode; and
authorize access to digital content based on verification of the passcode and identification of the user.

2. The enhanced reality system of claim 1, wherein translation of the gesture into the passcode comprises translating the gesture into ASCII characters.

3. The enhanced reality system of claim 1, wherein translation of the gesture into the passcode is based on the gesture made by the user and the relative positions of the sensors.

4. The enhanced reality system of claim 1, wherein the look-up table comprises height and limb length measurements of the user, wherein the controller is to determine relative positions of a plurality of sensors in order to determine a height and limb length measurements of the user and compare those height and limb length measurements to the height and limb length measurements in the look-up table.

5. The enhanced reality system of claim 1, wherein data defining the height and limb lengths of the user are used to translate the gestures into the passcode.

6. The enhanced reality system of claim 1, wherein the passcode is a hash value derived from execution, by the controller, of a hash function.

7. The enhanced reality system of claim 1, wherein the data defining changes in the positions of the sensors over time are translated into vectors to determine the gesture made by the user.

8. A method of providing authentication to digital content, comprising:
- receiving data from a plurality of sensors defining relative positions of a user's body and changes in positions of the plurality of sensors over time;
- determining a gesture made by the user based on a comparison of the relative positions of the user's body and a 3D representation of the gesture in a look-up table;
- determining an identity of the user based on the plurality of sensors corresponding to the relative positions of the user's body;
- translating the gesture into a passcode wherein the passcode and the identification of the user is used to authenticate the user; and
- authenticating, by execution of an authentication module by a controller, a user to access the digital content.

9. The method of claim 8, comprising translating the gesture into an alphanumeric passcode.

10. The method of claim 8, comprising translating the gesture into a hash file.

\* \* \* \* \*